United States Patent [19]

Fleischmann

[11] Patent Number: 5,222,992
[45] Date of Patent: Jun. 29, 1993

[54] CONTINUOUS COMBUSTION ROTARY ENGINE

[76] Inventor: Lewis W. Fleischmann, 8502 Allenswood Rd., Randallstown, Md. 21133

[21] Appl. No.: 864,935

[22] Filed: Apr. 7, 1992

[51] Int. Cl.⁵ ............................................ F02B 53/00
[52] U.S. Cl. .................................. 123/204; 123/213; 123/215; 123/238
[58] Field of Search ............... 123/204, 213, 215, 238, 123/246

[56] References Cited

U.S. PATENT DOCUMENTS

| | | | |
|---|---|---|---|
| 1,155,335 | 10/1915 | Bricknell | 123/246 |
| 1,919,355 | 7/1933 | Bancroft | 123/204 X |
| 2,447,929 | 8/1948 | Berry | 123/215 X |
| 3,174,274 | 3/1965 | Frye | 123/246 X |
| 3,693,601 | 9/1972 | Sauder | 123/204 X |
| 3,724,427 | 4/1973 | Sauder | 123/215 X |
| 3,863,610 | 2/1975 | Spinnett | 123/204 |
| 4,003,349 | 1/1977 | Habsburg | 123/246 |

FOREIGN PATENT DOCUMENTS 763794  2/1934  France ............... 123/246

*Primary Examiner*—Michael Koczo
*Attorney, Agent, or Firm*—Morton J. Rosenberg; David I. Klein

[57] ABSTRACT

A continuous combustion rotary engine (100) is provided for powering such vehicles as aircraft, boats and automobiles with an efficiency which approaches the total expansion of combustion gases. The continuous combustion rotary engine (100) includes a plurality of power stages (110, 130 and 150) for sequential progressive expansion of combustion exhaust gases in order to generate rotative forces on a plurality of main rotors (112, 114, 132, 134, 152, 154). Simultaneously, the driven rotors (112, 114, 132, 134, 152 and 154), acting in pairs, progressively compress air for use in supporting the continuous combustion in the central portion of the expansion section (92) within stage (110). The use of the same rotors to both be driven by the expanding combustion gases and compress the inlet air provides the instrumentality for cooling the rotors, the heat transferred therefrom serving to increase the efficiency of the compression process. Continuous combustion rotary engine (100) further includes a synchronization assembly (200) for maintaining the main rotors (112 and 114, 132 and 134, 152 and 154, as well as 176 and 178) to be meshingly engaged without the respective flutes (113 and 115, 133 and 135, 153 and 155) from coming in contact with each other.

18 Claims, 5 Drawing Sheets

CONTINUOUS COMBUSTION ROTARY ENGINE

BACKGROUND OF THE INVENTION

1. Field of the Invention

This invention directs itself to rotary internal combustion engines. In particular, this invention directs itself to a modular rotary engine wherein a combustible mixture of fuel is injected into supercharged air and ignited and expanded to rotate the engine drive shafts in successive steps by means of successively positioned rotors arranged in respective axially aligned power conversion rotor stages. More in particular, this invention pertains to rotary engines wherein the combustion air is supercharged by the same rotors which are driven by the expanding combustion gases. Further, the invention directs itself to rotors arranged in contactless meshing relationship wherein high temperature operation can be achieved through the use of ceramic material compositions.

2. Prior Art

Continuous combustion rotary engines and rotary engines in general are well known in the art. The best prior art known to the Applicant include U.S. Pat. Nos. 1,155,335; 2,246,235; 2,691,482; 3,498,184; 3,550,565; 3,640,252; 3,693,601; 3,699,930; 4,018,549; 4,068,984; 4,512,302; 4,776,779; and, 5,004,412.

Some prior art systems such as that shown in U.S. Pat. No. 3,693,601 are directed to rotary internal combustion engines comprising a plurality of rotary pumps arranged in successive communicating fashion. In such systems the stages of combustion gas expansion take place within a single cylinder and the expanded gases are thereby forced to successively enter the space between pairs of opposing rotors to cause a wedging action between the flutes, and thereby drive the respective drive shafts of each rotor set. The compression ratio for each of the sets of rotors is dependent upon the depth and width of the flutes in the cooperating rotors, with the axial length of each rotor being the same from one stage to the next. Whereas in the instant invention the expanding combustion gases are substantially prevented from such wedging action and flow tangentially with respect to the axial direction of the drive shafts within each cylinder. Thus in the instant invention the force generated by the expanding combustion gases is a function of the axial length of the rotor, with the height of the flutes being uniform throughout the engine. Further, the instant invention isolates each set of rotors in individual stages or cylinders, and through the utilization of purging rotors substantially divides the cylinder or stage into two sections, one for expansion of the combustion gases and a second portion for compression of the air to be supplied for mixing with the fuel.

In other prior art systems, such as that disclosed in U.S. Pat. No. 1,155,335 there are provided internal combustion rotary engines utilizing intermeshing rotors. Here again, the combustible fuel is carried by the spaces between the intermeshing teeth of the rotors, compressing the fuel and sequentially feeding the fuel to a combustion chamber defined between the rotors and a portion of the casing. This is volumetrically very inefficient because the very small air/fuel charge trapped between the intermeshing teeth are then expanded into a very large volume, resulting in a low horsepower output. While such systems may include purging rotors (FIG. 17), such are utilized for maximizing the intake of fresh air. These intermeshing rotors are utilized for expelling any exhaust gas which might tend to remain in the spaces between the gear teeth, and create a vacuum to aid in bringing fresh air into the engine. Whereas in the instant invention purging rotors are utilized to prevent combustion gases from passing from the expansion section of the cylinder to the compression portion, as well as preventing the compressed air from entering the expansion section.

In still other prior art systems there are known compound steam engines having had a plurality of cylinders, each cylinder having a different displacement. The high pressure steam entered the smallest displacement cylinder first, then exhausted into one or more intermediate cylinders and then to the largest cylinder before being exhausted to ambient. All of the cylinders being coupled to a common crank shaft for maximizing the utilization of the steam's energy. By exhausting the steam pressure at near ambient conditions such approaches the phenomenon called "total expansion". While this concept of maximizing the utilization of the steam's energy has been applied to turbine type power plants, such has never been known to be successfully applied to rotary pump type engines.

SUMMARY OF THE INVENTION

A continuous combustion rotary engine is provided. The continuous combustion rotary engine includes a longitudinally extended housing enclosing a plurality of power conversion stages coaxially through which a pair of main drive shafts extend longitudinally through each of the plurality of stages in substantially parallel relation. The continuous combustion rotary engine further includes a first rotor assembly disposed within a first of the plurality of stages and coupled to the pair of main drive shafts for (1) compression of ambient air to a first predetermined higher pressure value in one portion of the stage, and (2) expansion of combustion exhaust gases in another portion of the first stage, and displacement therefrom. A second rotor assembly disposed within a second of the plurality of stages is provided. The second rotor assembly is coupled to the pair of main drive shafts for (1) further compression of the compressed air from the first stage to a second predetermined pressure value in one portion of the second stage, and (2) expansion of the combustion exhaust gases in another portion of the second stage and displacement of the combustion exhaust gases to the first stage for further expansion therein. A third rotor assembly disposed within a third of the plurality of stages is included. The third rotor assembly is coupled to the pair of main drive shafts for (1) further compression of the compressed air from the second stage to supercharge the air in a compression portion of the third stage, (2) combustion of a fuel injected into an expansion portion of the third stage and mixed with the supercharged air therein, and (3) displacement of the combustion exhaust gases to the second stage for further expansion therein. The continuous combustion rotary engine also includes an instrumentality for transferring the supercharged air from the compression portion of the third stage to the expansion portion of that stage. The means for igniting the mixture of the fuel and the supercharged air is disposed within the third stage.

DESCRIPTION OF THE PREFERRED EMBODIMENTS

Referring to FIGS. 1-5, there is shown continuous combustion rotary engine 100 designed to operate on a wide variety of fuels. As will be seen in following paragraphs, continuous combustion rotary engine 100 is specifically directed to the concept of providing an engine offering a high horsepower to weight ratio with both high thermal and mechanical efficiency. Continuous combustion rotary engine 100 is ideally suited for aircraft applications, by virtue of its high RPM capability, but equally lends itself to powering both land and waterborne vehicles. Additionally, continuous combustion rotary engine 100 is of modular construction permitting compound multistage engine embodiments to easily be constructed. Further, each successive stage is designed to substantially impart the same force as the preceding stage, from a lower temperature lower pressure expansion of combustion gases, and therefore each successive stage is of increasing displacement to provide an engine which approaches the ideal condition of "total expansion".

Figure 1:
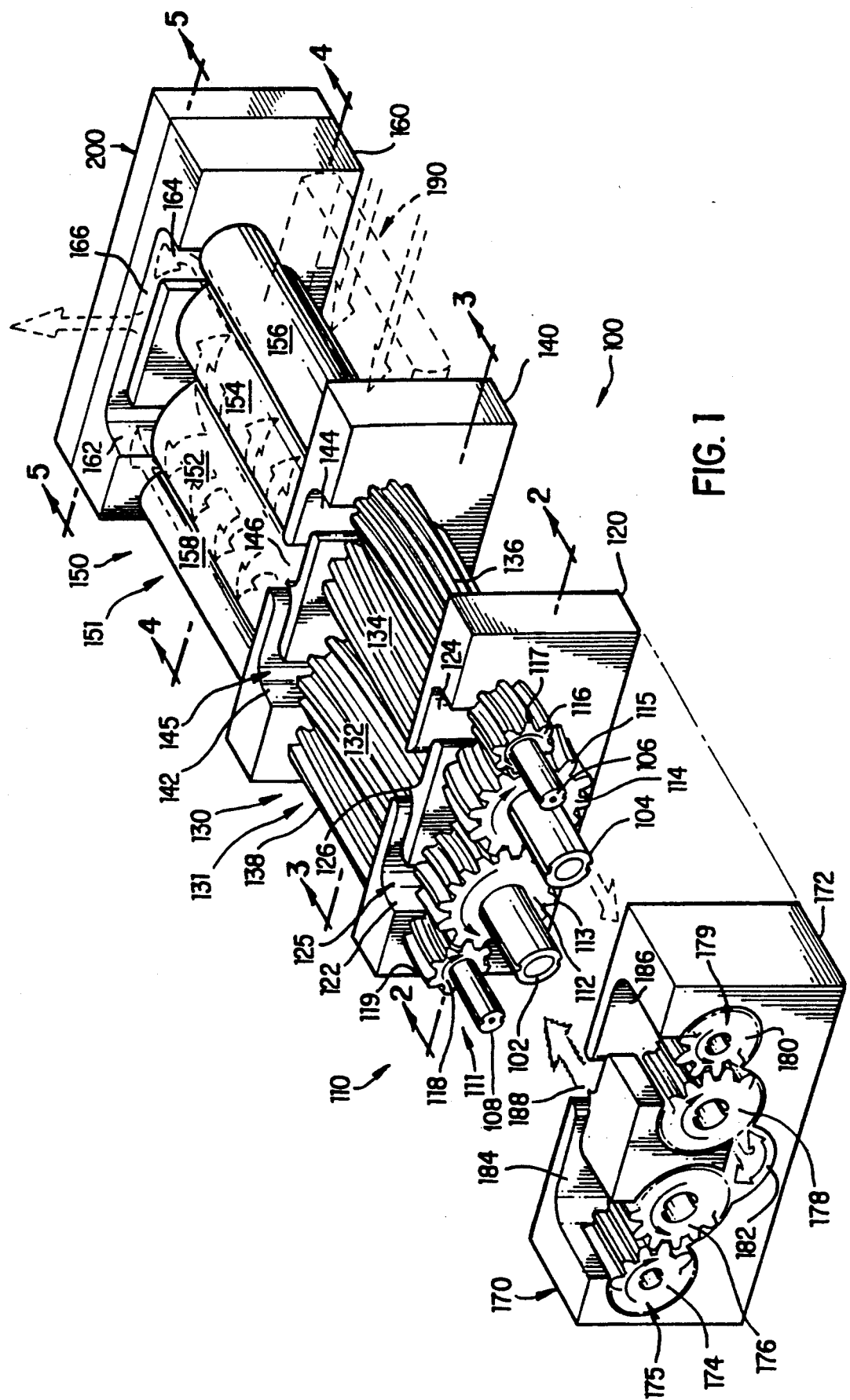
FIG. 1 is an exploded perspective view of the rotary engine.
Figure 2:
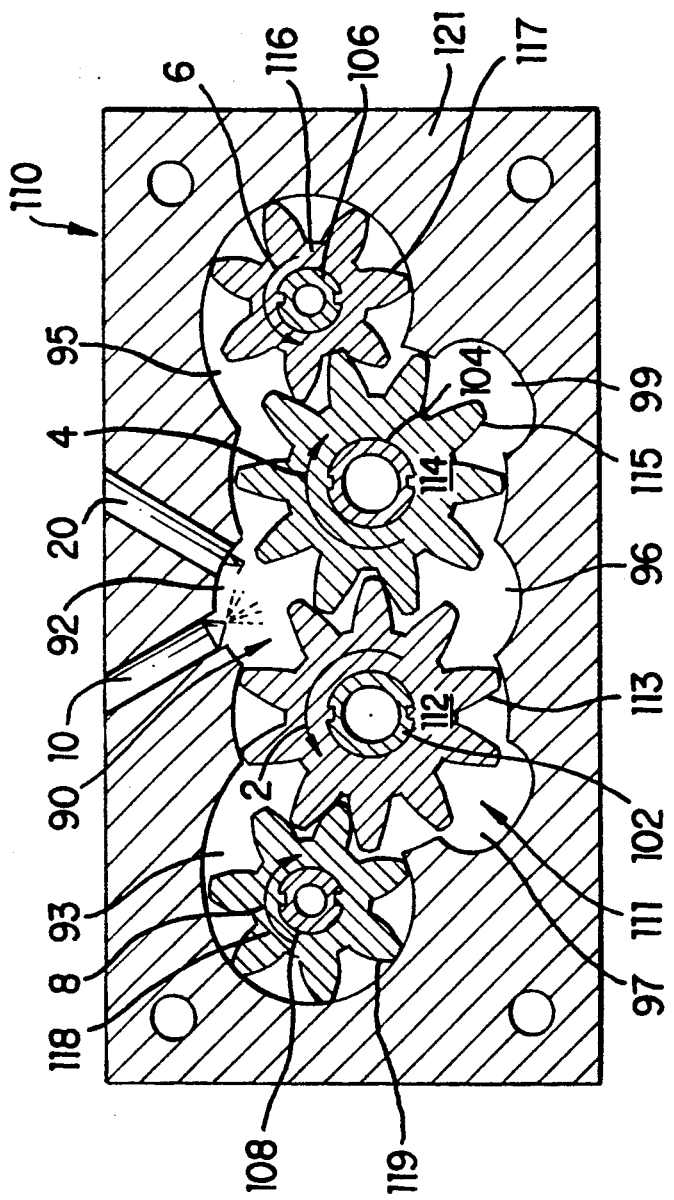
FIG. 2 is a sectional view of the rotary engine taken along the section line 2—2 of FIG. 1.

Referring now to FIGS. 1 and 2, there is shown a partially exploded view of the internal structure for a multistage embodiment of continuous combustion rotary engine 100. The high pressure stage 110 is defined by a high pressure rotor assembly 111 disposed within a longitudinally extended cavity formed within the housing 121, shown in FIG. 2. High pressure rotor assembly 111 includes a pair of main rotors 112, 114, meshingly engaged one with the other. High pressure rotor assembly 111 further includes a pair of purging rotors 116, 118, each meshingly engaged with a respective one of the main rotors 112, 114. Each of the main rotors 112, 114 are coupled to a respective main drive shaft 102, 104 for rotation therewith. Similarly, each of the purging rotors 116, 118 are coupled to a respective secondary drive shaft 106, 108 for rotation therewith. Each of the high pressure main rotors 112, 114 is provided with a plurality of flutes 113, 115 respectively. Flutes 113 and 115 may be helically contoured, such helical contour being in a direction to aid in directing the expansion and compression functions of the main rotors 112, 114, as will be described in following paragraphs.

Of critical importance to the operation of continuous combustion rotary engine 100 is the concept of the meshing engagement between main rotors 112 and 114, each with the other, and meshing engagement of each of purging rotors 116 with main rotor 114 and purging rotor 118 with main rotor 112, all such engagement being made without contact between their respective flutes. The contactless meshing engagement between respective rotor elements is of critical importance in that it enables engine 100 to operate at higher thermal and mechanical efficiencies than would otherwise be possible. High thermal efficiency is achieved through the high temperature operation, which may exceed 3000° F. Ceramic material compositions are best suited for such high temperature operation. However, the service life of ceramic rotors would be short if they were continually contacting one another. Thus, the difficulty of using ceramic rotors is overcome, and high thermal efficiency can be achieved. The rotors are dimensioned to provide a minimal clearance at the operating temperature, and ceramic materials utilized for the rotors are chosen to have a coefficient of thermal expansion approximating $0.3 \times 10^{-6}$ in/in/°F. The contactless engagement of the rotor assembly 111 provides increased mechanical efficiency owing to the absence of friction which would otherwise be present if the flutes of one rotor made physical contact with those of another.

Referring more particularly to FIG. 2, there is shown a sectional view of the high pressure stage 110 having an internal cavity 90 in which is disposed in the high pressure rotor assembly 111. The high pressure rotor assembly 111 divides the cavity 90 into two sections, an expansion section 92 and a compression section 96. The central portion of the expansion section 92 defines a combustion chamber in which supercharged air is supplied for mixing with fuel supplied by means of a fuel injection nozzle 10. The combustible mixture formed therein being ignited by means of an igniting device 20. Igniting device 20 may be a conventional spark or glow plug type device energized during the initial starting of engine 100, but not required thereafter as combustion is continuous as long as air and fuel are continually supplied thereto. Therefore, the engine is easily shut down by cutting off the fuel supply to stage 110.

When the air-fuel mixture is ignited, the temperature and pressure within the central portion of expansion section 92 increases rapidly, exerting force in all directions. The meshing of the main rotors 112, 114 creates an imbalance in the exposed flute surface area, there being a greater flute surface area laterally, in opposed directions, when compared with the downward direction. The greater lateral flute surface area generates a force in the lateral direction substantially twice that of the force directed downwardly, thereby driving each of the respective rotors, 112 in a counterclockwise direction and 114 in a clockwise direction, as indicated by the directional arrows 2 and 4. Accompanying the rotation of the main rotors 112, 114 is the displacement and expansion of the combustion gases from the central portion of the expansion section 92 transversely to the opposing lateral expansion zones 93, 95, the combustion gases being carried in the spaces between adjacent flutes of each respective rotor. From the respective lateral expansion zones 93 and 95, the combustion gases are directed to the central portion of the expansion section of a next successive stage, or alternatively to an exhaust port leading to ambient for a single stage embodiment.

The high pressure, high temperature combustion gases pass from the respective zones 93 and 95 through the wishbone-shaped exhaust port passage 125 formed in the header 120. The exhaust gases are substantially prevented from passing from the expansion section 92 to the compression section 96 by the respective purging rotors 116 and 118. As will be described in following paragraphs, each of the main drive shafts 102 and 104, and secondary drive shafts 106 and 108 are rotated in synchronism to provide contactless meshing between the two main rotors 112, 114, and each of the purging rotors 116, 118 with respective one of the main rotors 114, 112. The meshing engagement of the purging rotor 118 with the main rotor 112, and the close-fitting relation of rotor 118 within the cavity portion 93 substantially prevents exhaust gases from continuing to be carried between the flutes 113 of main rotor 112, preventing the combustion gases from being carried completely around from the expansion section 92 to the compression section 96, whose function will be described in following paragraphs. Although some gases will leak between the expansion section 92 and compression section 96, such is analogous to exhaust gas recirculation, provided in most modern internal combustion engines, and also provides additional heat energy to air which is compressed in the compression section 96, and will subsequently be utilized to support the combustion in the expansion section 92. Similarly, purging rotor 116 functions to purge exhaust gases trapped between the flutes 115 of main rotor 114. The combustion gases having expanded through displacement from the combustion chamber defined by the central portion of expansion section 92 to the two opposing lateral portions 93 and 95, the exhaust gases pass through the respective exhaust ports 122, 124 formed in the header 120 adjacent sections 93 and 95, respectively. The exhaust gases are directed through the wishbone-shaped exhaust port passage 125 to the exit port 126 which supplies the next, lower pressure, stage 130 with the pressurized gas for further expansion thereof.

Figure 3:
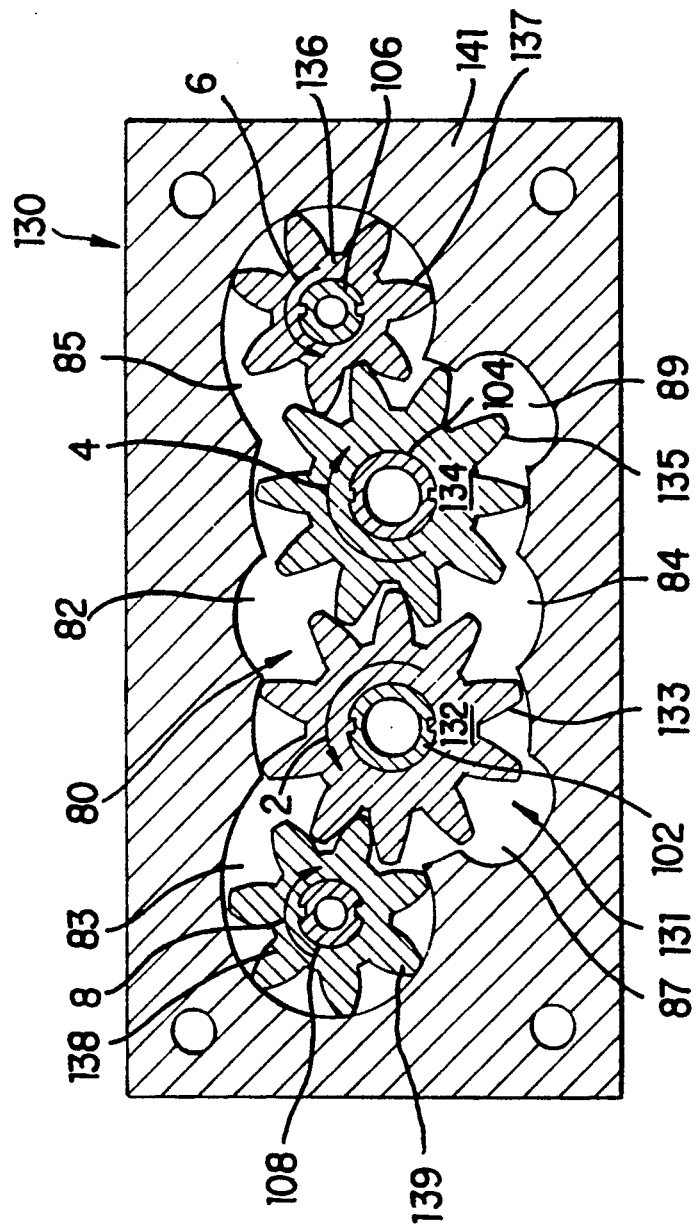
FIG. 3 is a sectional view of the rotary engine taken along the section line 3—3 of FIG. 1.

The lower pressure stage 130 is provided with a rotor assembly 131 rotatively disposed within a longitudinally extended cavity 80 formed in stage 130 (FIG. 3). Rotor assembly 131 includes a pair of main rotors 132, 134 and a pair of purging rotors 136, 138. Each of main rotors 132, 134 is coupled to a respective one of the drive shafts 102, 104 for simultaneous rotation with main rotors 112 and 114 of high pressure rotor assembly 111. Similarly, purging rotors 136 and 138 are each coupled to a respective one of the secondary drive shafts 106, 108 for rotation simultaneous with that of the purging rotors 116, 118. The main rotors 132, 134 and purging rotors 136, 138 are substantially identical to their higher pressure counterparts 112, 114 and 116, 118, with the exception of their axial dimension, which is greater for each of the rotors of the lower pressure assembly 131, as compared to the higher pressure assembly 111. Thus, the surface area of the flutes for the rotors of assembly 131 is greater than the surface area of the rotors of assembly 111. Since the pressure of the combustion gases is lower within the stage 130, as compared to stage 110, the larger working surface area can be utilized to compensate for the lower pressure. Thus, each successive stage, although operating at lower pressure is designed to impart an equivalent force to the drive shafts 102, 104, each being dimensioned to provide a successively greater displacement.

Referring additionally to FIG. 3, there is shown, a sectional view of the lower pressure stage 130 having a cavity 80 in which is disposed the lower pressure rotor assembly 131. Longitudinally extended cavity 80 is formed within a housing 131 bounded on one end by the header 120 and on the opposing end by a header 140, wherein the exhaust gases enter stage 130 from the exhaust port 126 formed in header 120, are expanded therein, and exit from stage 130 through the header 140. The exhaust gases entering the central portion of the expansion section 82 of stage 130 apply a force, equal in all directions, against the respective flutes 133 and 135 of respective main rotors 132 and 134. Such forces act to rotate rotors 132 and 134 in opposing directions, wherein rotor 132 rotates counterclockwise, as indicated by directional arrow 2, while rotor 134 rotates clockwise, as indicated by directional arrow 4. The exhaust gases present in the central portion of the expansion section 82 are carried in the spaces between adjacent flutes 133 of rotor 132 and the spaces between adjacent flutes 135 of rotor 134 to the respective lateral end portions 83, 85 of expansion section 82. As noted earlier, the rotation of main drive shafts 102, 104 and secondary drive shafts 106, 108 are synchronized such that main rotors 132 and 134 are meshingly engaged without respective flutes 133, 135 ever contacting one another, as is true for the flutes 133 of main rotor 132 with respect to contacting the flutes 139 of purging rotor 138, and similarly, the flutes 137 of purging rotor 136 do not contact the flutes 135 of main rotor 134.

As previously described, the purging rotors serve to remove the expanded gases from the spaces between the adjacent flutes, which gases would otherwise be carried from the expansion section 82 to the compression section 84. From the opposing lateral portions 83, 85 of expansion section 82 the exhaust gases, now lower in pressure and temperature, pass through the respective inlet ports 142, 144 of the wishbone-shaped exhaust port passages 145 formed in the header 140. The exhaust gases exit from the wishbone-shaped exhaust port passage 145 through the outlet exhaust port 146 for use in driving a successive stage, or alternately for exit to ambient, if the engine were a two stage embodiment.

Figure 4:
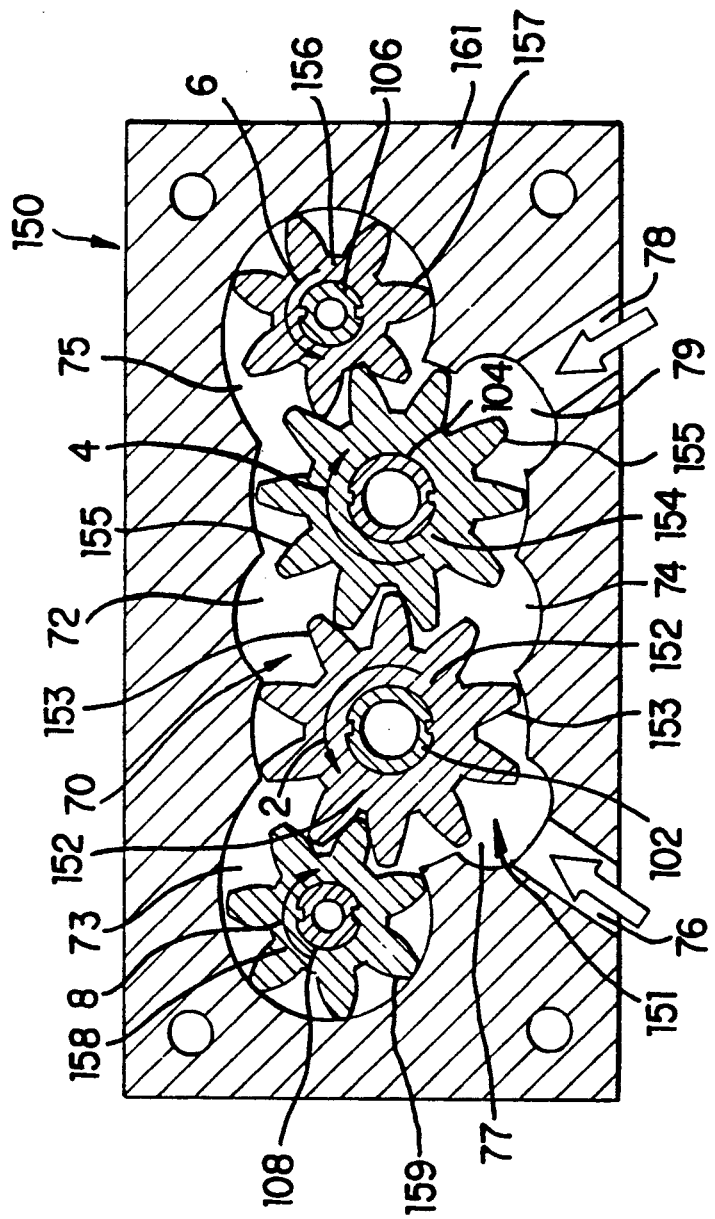
FIG. 4 is a sectional view of the rotary engine taken along the section line 4—4 of FIG. 1; and, FIG. 5 is a sectional view of the rotary engine taken along the section line 5—5 of FIG. 1.

The embodiment of FIG. 1 includes a third stage, or stage 150 having a rotor assembly 151 disposed within the longitudinally extended cavity 70 formed in the housing 161, shown in FIG. 4. The rotor assembly 151 includes a pair of main rotors 152, 154 and a pair of purging rotors 156, 158. Each of the main rotors 152, 154 is coupled to a respective one of the drive shafts 102, 104 for simultaneous rotation with main rotors 112, 114, 132, and 134. Similarly, purging rotors 156, 158 are each coupled to a respective one of the secondary drive shafts 106, 108 for simultaneous rotation with purging rotors 116, 118, 136, and 138. Here again, the main rotors 152, 154 and purging rotors 156, 158 are substantially identical to their higher pressure counterparts 112, 114, 132, 134 and 116, 118, 136, 138, with the exception that their axial dimension is greater for each of the rotors of rotor assembly 151, as compared with those of the preceding higher pressure stage 131.

The combustion gases are of the highest temperature and pressure within the high pressure stage 110, expanding therein and thus being at a lower pressure and temperature upon entering the stage 130. Within stage 130 they are further expanded, providing gases at a lower pressure and temperature to the third stage 150, for yet further expansion and reduction in temperature prior to being exhausted from the engine. The greater axial dimension for the rotors 152, 154 provides a flute surface area which is greater than that of the flutes of the main rotors 132, 134 in the preceding stage. Since the pressure of the combustion gases is lower within stage 150 than that of stage 130, the larger working surface area of the flutes is designed to compensate for the lower pressure and impart an equivalent force to the drive shafts 102, 104 to that of each of the preceding higher pressure stages.

Referring additionally to FIG. 4, there is shown a sectional view of the lower pressure stage 150 having a rotor assembly 151 disposed within the longitudinally extended cavity 70 formed in the housing 161. Longitudinally extended cavity 70 is bounded on one end by the header 140, and on the opposing end by the exhaust header 160. The operation of the rotor assembly 151 in this third stage is identical to that of the previous stage, as has been described in preceding paragraphs. The combustion gases enter stage 150 through the outlet port 146 formed in header 140 to rotatively drive the main rotors 152 and 154, the combustion gases being transversely displaced from the central portion of the expansion section 72 to the opposing lateral zones 73 and 75 for exit through respective exhaust ports 162, 164 formed in the exhaust header 160 for exit through the exhaust outlet port 166.

Continuous combustion rotary engine 100 is of modular construction, wherein the headers 120 and 140 are identical, and any number of such headers may be interposed between a successive series of rotor housings to form compound engines of any desired number of stages. Thus, a single stage embodiment would incorporate an air transfer assembly 170, a rotor stage 110, an exhaust header 160 and a synchronization assembly 200. For a single stage embodiment, the rotor stage 110 would require air intake ports, as provided in stage 150, or alternately, some other source of air could be supplied to the air transfer assembly 170. For compound engines, as previously described, each of the successive stages would be separated by a header, such as header 120.

Although not shown, the header and housing members may be provided with oil galleys, and fluid passageways, if liquid cooling is desired. Each of the drive shafts 102, 104, 106 and 108 are hollow tubular shafts which may be utilized for the distribution of lubricant. Each of the headers 120, 140 and 160, as well as the housing for the air transfer assembly 170 may incorporate bearings, such as needle bearings, for rotative support of the respective drive shafts. Thus, the lubricant can be pumped through the drive shaft, for distribution to the various bearings with such lubricant being returned through the oil galleys formed in the headers and rotor housings. Such lubrication distribution systems are well known in the art, and are therefore not described in any greater detail herein.

Another key feature of continuous combustion rotary engine 100 is the method by which the combustion supporting air entering through the inlet manifold 190 is supercharged, utilizing a section of each rotor stage to progressively compress and heat the air to be supplied to the high pressure combustion chamber. As shown in FIG. 4, the housing 161 includes an air inlet manifold defined by a pair of air inlet ports 76, 78 for drawing air into the compression section 74 of stage 150. Air is drawn in to each of the opposing lateral zones 77, 79 of compression section 74 of the cavity 70, and forced into the central compression region of section 74 by the rotation of the two main rotors 152, 154. The air is carried by the spaces between adjacent flutes 153 of rotor 152 and the spaces between adjacent flutes 155 of rotor 154. Rotor 152 rotates counterclockwise, as indicated by directional arrow 2, while rotor 154 rotates clockwise, as indicated by directional arrow 4. The meshing engagement between rotors 152 and 154 substantially preventing the air from being carried around with the spaces between adjacent flutes to the compression section 72. In addition to heating the air by means of the compressive work being performed, the air is heated by heat transfer from the main rotors 152, 154, which were heated by the exhaust gases being displaced from the central portion of expansion zone 72 to the opposing lateral zones 73 and 75. Obviously, this heat transfer also serves to cool the main rotors 152, 154. The compressed air disposed in the central section 74 passes to stage 130 through a wishbone-shaped air transfer passage having an identical configuration as the exhaust passage 145, but formed on the opposing end of header 140. The wishbone-shaped air transfer passage has a single inlet in line with the central portion of compression section 74 and a pair of outlet ports which open into the opposed lateral portions 87, 89 of compression section 84 of the stage 130, as shown in FIG. 3. Here again, the rotation of the main rotors 132, 134 carry the air from the opposed lateral zones 87, 89 to the central portion of compression section 84, further heating the air by virtue of the work performed and the heat transfer from the rotors. The rotors 132, 134 operate at a higher temperature than rotors 152, 154, as they are exposed to higher temperature combustion gases in the expansion section 82. The compressed air disposed within the central portion of compression section 84 is transferred to the high pressure stage 110 through another wishbone-shaped air transfer passage formed in header 120. A single inlet port is provided in alignment with the central portion of compression section 84 for directing the compressed air to opposed lateral zones 97, 99 of compression section 96, shown in FIG. 2.

The air entering stage 110 is further compressed by the rotary action of the main rotors 112 and 114, forcing the air into the central portion of the compression section 96, while increasing the air temperature further by virtue of the compressive work and thermal transfer from the higher temperature rotor surfaces. The compressed air disposed within the central portion of compression section 96 must be supplied to the combustion chamber defined by the central portion of expansion section 92. In order to transfer the compressed air, a dual gear pump assembly 170 is provided. This air transfer assembly 170 comprises two gear pumps for transferring the air from compression section 96 to expansion section 92.

Gear pump 175, shown in FIG. 1, comprises a pair of rotors 174 and 176, each coupled to a respective drive shaft 108, 106 for transferring air from a central inlet passage 182 to an outlet passage 184. Similarly, the second gear pump 179 comprises a rotor 178 coupled to the main drive shaft 104 and a rotor 180 coupled to the secondary drive shaft 106 for transferring air from the central passage 182 to an outlet passage 186. Respective rotors 174 and 176, 178 and 180 are meshingly engaged such that contact is not made between their respective flutes, as has been previously described for the main and purging rotors. The compressed air from outlet passages 184 and 186 exit the air transfer assembly 170 through an outlet port 188, which is aligned with the central portion of the expansion section 92. As the engine operates in a continuous combustion fashion, there is no need for valves or other means to regulate the air flow, as the air flow is supplied in proportion to the RPM of the respective drive shafts. Thus, the same rotors against which the expanding combustion gases operate, providing the driving force, also compress the air required for combustion. The rotors, having been heated by the hot combustion gases, are cooled by the air being compressed. The heat removed from the rotors being added to the air also functions to increase the efficiency of the compression process, as the added heat serves to further increase the air pressure delivered to the combustion chamber.

As has been previously discussed, the ability to operate at high temperature is accomplished through the use of ceramic material compositions, which further aid in reducing the weight of engine 100. The synchronizing gear assembly 200 functions to maintain the relationship between each of the meshingly engaged rotors such that they may be rotated without contact between interfitting flutes.

Figure 5:
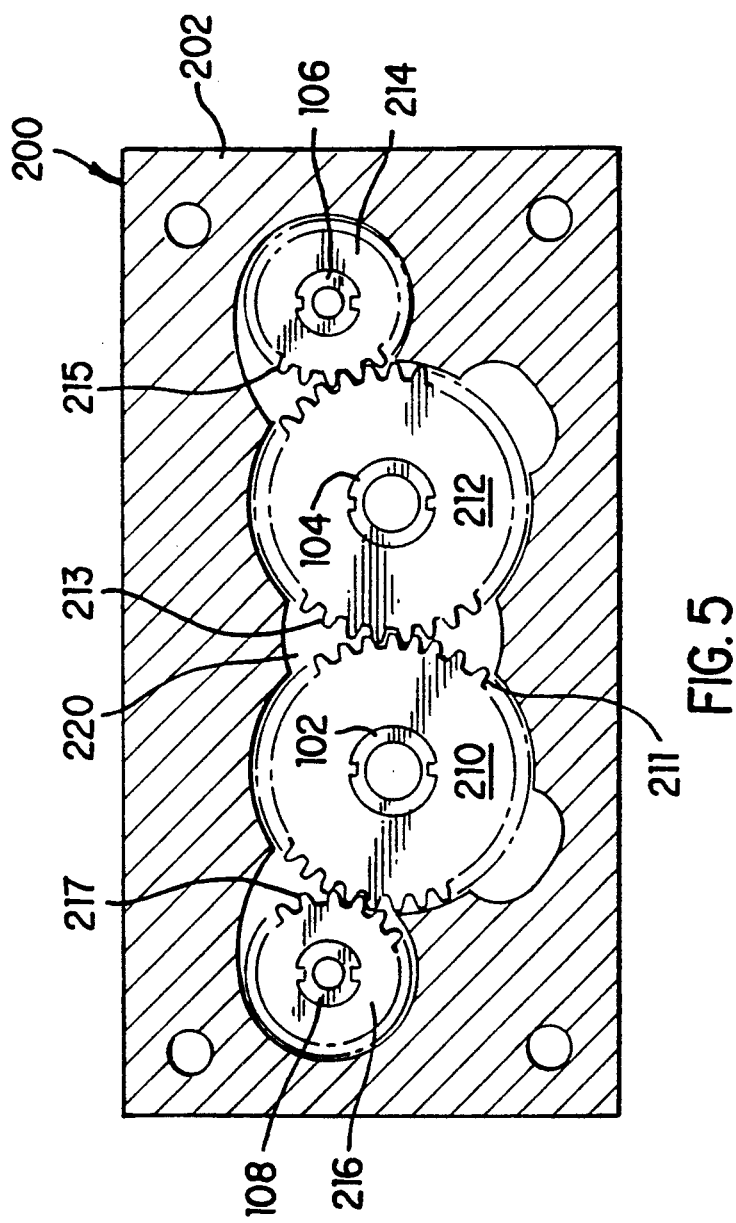

Referring to FIG. 5, there is shown the synchronizing gear assembly 200 having a cavity 220 formed in the housing 202. Within cavity 220 there are provided a pair of main fine tooth helical gears 210 and 212 disposed in meshing engagement therein. Main helical gear 210 is coupled to the main drive shaft 102 for rotation therewith. Similarly, main helical gear 212 is coupled to main drive shaft 104. Each of main gears 210 and 212 are provided with a plurality of flutes 211, 213, respectively, for maintaining the contactless relationship of the main rotors 112, 114, 132, 134, 176, 178, 152 and 154. Synchronizing gear assembly 200 further includes secondary helical gear members 216 and 214, each respectively coupled to the secondary drive shafts 108, 106. Secondary helical gears 216 and 214 are respectively meshingly engaged with a respective one of the main helical gears 210, 212 for maintaining the contactless relationship of the respective secondary rotors 118, 116, 138, 136, 174, 180, 158 and 156 with respective one of the main rotors in each of the respective stages. Each of the secondary helical gears 216 and 214 are provided with a plurality of flutes 217, 215 for engagement between respective flutes 211 and 213 of respective main helical gears 210 and 212. The finer pitch of the helical gears 210, 212, 214 and 216, as compared to the respective flutes of the rotors, maintain the necessary synchronization to permit the necessary contactless engagement of the rotor assemblies 111, 131 and 151, and that of the gear pumps 175 and 179. The helical gear members 210, 212, 214 and 216 are bathed in lubricating oil, by means of an oil pump (not shown), for reducing friction and maintaining the operating temperature within cavity 220 within predetermined limits.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A continuous combustion rotary engine, comprising: a longitudinally extended housing enclosing a plurality of rotor stages disposed coaxially each with respect to another;
   a pair of main drive shafts extending longitudinally through each of said plurality of stages in substantially parallel relation;
   first rotor means disposed within a first of said plurality of stages and coupled to said pair of main drive shafts for (1) compression of ambient air to a first predetermined higher pressure value in one portion of said first stage, and (2) expansion of combustion exhaust gases in another portion of said first stage and displacement therefrom;
   second rotor means disposed within a second of said plurality of stages and coupled to said pair of main drive shafts for (1) further compression of said compressed air from said first stage to a second predetermined pressure value in one portion of said second stage, and (2) expansion of said combustion exhaust gases in another portion of said second stage and displacement of said combustion exhaust gases to said first stage for further expansion therein;
   third rotor means disposed within a third of said plurality of stages and coupled to said pair of main drive shafts for (1) further compression of said compressed air from said second stage to supercharge said air in a compression portion of said third stage, (2) combustion of a fuel injected into an expansion portion of said third stage and mixed with said supercharged air therein, and (3) displacement of said combustion exhaust gases to said second stage for further expansion therein;
   means for transferring said supercharged air from said compression portion of said third stage to said expansion portion of said third stage; and,
   means for igniting said mixture of said fuel and said supercharged air disposed in said third stage.

2. The continuous combustion rotary engine as recited in claim 1 further comprising:
   first header means disposed between said first and second stages for (1) directing said compressed air from a single air outlet of said first stage to a pair of air inlets of said second stage, and (2) directing said combustion exhaust gases from a pair of exhaust outlets of said second stage to a single exhaust inlet of said first stage; and
   second header means disposed between said second and third stages for (1) directing said compressed air from a single air outlet of said second stage to a pair of air inlets of said third stage, and (2) directing said combustion exhaust gases from a pair of exhaust outlets of said third stage to a single exhaust inlet of said second stage.

3. the continuous combustion rotary engine as recited in claim 1 where said transfer means is coupled to said pair of main drive shafts and is devoid of valves.

4. The continuous combustion rotary engine as recited in claim 1 where said transfer means includes a pair of gear pumps, each of said gear pumps being driven by a respective one of said pair of main drive shafts.

5. The continuous combustion rotary engine as recited in claim 1 where said first rotor means includes a pair of first main rotor members disposed in said first stage to define a compression portion of said first stage and an expansion portion thereof, each of said pair of first main rotor members being coupled to a respective one of said main drive shafts for substantial meshing engagement therebetween, each of said pair of main rotor members having a predetermined axial length dimension.

6. The continuous combustion rotary engine as recited in claim 5 where said first rotor means further includes a pair of first purging rotor members disposed in said first stage for rotation about an axis extending in substantially parallel relation with said pair of main drive shafts, each of said pair of first purging rotor members being in substantially meshing engagement with a respective one of said pair of first main rotor members and having an axial length dimension substantially equal thereto.

7. The continuous combustion rotary engine as recited in claim 6 where each of said pair of first main rotor members and each of said pair of first purging rotor members have a plurality of radially extending flutes formed thereon.

8. The continuous combustion rotary engine as recited in claim 7 where said second rotor means includes a pair of second main rotor members disposed in said second stage to define a compression portion of said second stage and an expansion portion thereof, each of said pair of second main rotor members being coupled to a respective one of said main drive shafts for substantial meshing engagement therebetween, each of said pair of second main rotor members having a predetermined axial length dimension less than said axial length dimension of each of said pair of first main rotor members.

9. The continuous combustion rotary engine as recited in claim 8 where said second rotor means further includes a pair of second purging rotor members disposed in said second stage for rotation about an axis extending in substantially parallel relation with said pair of main drive shafts, each of said pair of second purging rotor members being in substantially meshing engagement with a respective one of said pair of second main rotor members and having an axial length dimension substantially equal thereto.

10. The continuous combustion rotary engine as recited in claim 9 where each of said pair of second main rotor members and each of said pair of second purging rotor members have a plurality of radially extending flutes formed thereon.

11. The continuous combustion rotary engine as recited in claim 10 where said third rotor means includes a pair of third main rotor members disposed in said third stage to define said compression portion of said third stage and said expansion portion thereof, each of said pair of third main rotor members being coupled to a respective one of said main drive shafts for substantial meshing engagement therebetween, each of said pair of third main rotor members having a predetermined axial length dimension less than said axial length dimension of said pair of second main rotor members.

12. The continuous combustion rotary engine as recited in claim 11 where said third rotor means further includes a pair of third purging rotor members disposed in said third stage for rotation about an axis extending in substantially parallel relation with said pair of main drive shafts, each of said pair of third purging rotor members being in substantially meshing engagement with a respective one of said pair of third main rotor members and having an axial length dimension substantially equal thereto.

13. The continuous combustion rotary engine as recited in claim 12 where each of said pair of third main rotor members and each of said pair of third purging rotor members have a plurality of radially extending flutes formed thereon.

14. The continuous combustion rotary engine as recited in claim 13 further comprising synchronizing means coupled to said pair of main drive shafts for substantially preventing contact between respective flutes of each of said first main rotor members, second main rotor members, third main rotor members, and at least a pair of gear pump members being driven by a respective one of said main drive shafts.

15. The continuous combustion rotary engine as recited in claim 14 where each of said pair of (1) first main rotor members, (2) second main rotor members, (3) third main rotor members, (4) first purging rotor members, (5) second purging rotor members, (6) third purging rotor members, and (7) air transfer gear pump members are formed of a ceramic material composition, thereby providing means for transferring heat from said expansion portions of said plurality of stages to said air disposed in respective compression portions thereof.

16. A continuous combustion rotary engine, comprising:
    a housing having a longitudinally extended cavity formed therein;
    a pair of main drive shafts extending through said cavity in said longitudinal direction, said main drive shafts being disposed in substantially parallel relation one with respect to the other;
    at least one pair of main rotor members disposed within said cavity, each of said pair of main rotor members being coupled to a respective one of said main drive shafts, each of said pair of main rotor members having a plurality of radially extending flutes formed thereon, wherein said pair of main rotor members are meshingly engaged substantially without contact between respective flutes of said pair of main rotor members;
    a pair of secondary drive shafts extending through said cavity in said longitudinal direction, each of said pair of secondary drive shafts being disposed in spaced parallel relation to a respective one of said pair of main drive shafts;
    at least one pair of purging rotor members disposed within said cavity, each of said pair of purging rotor members being coupled to a respective one of said secondary drive shafts, each of said pair of purging rotor members having a plurality of radially extending flutes formed thereon, wherein each of said pair of purging rotor members are meshingly engaged with a respective one of said pair of main rotor members substantially without contact between respective flutes thereof;
    means for supplying fuel to a first portion of said cavity;
    means for supplying air to a second portion of said cavity, whereby said air is compressed and heated in said second portion of said cavity by rotation of both said pair of main rotor members and said pair of purging rotor members;
    means for transferring said compressed air from said second portion of said cavity to said first portion to mix with said fuel; and,
    means for igniting said fuel and air mixture.

17. The continuous combustion rotary engine as recited in claim 16 where said transfer means includes a pair of gear pumps, each of said gear pumps being driven by a respective one of said pair of main drive shafts.

18. The continuous combustion rotary engine as recited in claim 17 further comprising synchronizing means coupled to both said pair of main drive shafts and said pair of secondary drive shafts for substantially preventing contact between respective flutes of each of said main rotor members, and between respective flutes of each of said purging rotor members and a respective one of said pair of main rotor members, and respective gear pump members.

* * * * *